(12) United States Patent
Reineke et al.

(10) Patent No.: US 11,302,078 B2
(45) Date of Patent: Apr. 12, 2022

(54) THREE-DIMENSIONAL MAP GENERATION WITH METADATA OVERLAY FOR VISUALIZING PROJECTED WORKFLOW IMPACT IN COMPUTING ENVIRONMENT

(71) Applicant: EMC IP Holding Company LLC, Hopkinton, MA (US)

(72) Inventors: Nicole Reineke, Northborough, MA (US); Valerie Charry, Melrose, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 173 days.

(21) Appl. No.: 16/592,436

(22) Filed: Oct. 3, 2019

(65) Prior Publication Data
US 2021/0104098 A1    Apr. 8, 2021

(51) Int. Cl.
*G06T 19/00* (2011.01)

(52) U.S. Cl.
CPC .................. *G06T 19/006* (2013.01)

(58) Field of Classification Search
None
See application file for complete search history.

(56) References Cited

U.S. PATENT DOCUMENTS

| | | |
|---|---|---|
| 5,956,665 A | 9/1999 | Martinez et al. |
| 6,384,842 B1 | 5/2002 | DeKoning et al. |
| 7,322,010 B1 | 1/2008 | Mikula |
| 7,447,807 B1 | 11/2008 | Merry et al. |
| 9,958,277 B1 | 5/2018 | Espy et al. |
| 9,959,190 B2 | 5/2018 | Klein et al. |
| 11,107,284 B2 * | 8/2021 | Deck ................. H04L 67/12 |
| 2005/0090911 A1 | 4/2005 | Ingargiola et al. |
| 2006/0095662 A1 | 5/2006 | Arnott |
| 2008/0040522 A1 | 2/2008 | Matthews |
| 2009/0003353 A1 | 1/2009 | Ding et al. |
| 2009/0249213 A1 | 10/2009 | Murase et al. |
| 2010/0191908 A1 | 7/2010 | Yamakawa |
| 2010/0317420 A1 | 12/2010 | Hoffberg |
| 2011/0115816 A1 | 5/2011 | Brackney |
| 2011/0310120 A1 | 12/2011 | Narayanan |
| 2012/0090004 A1 | 4/2012 | Jeong |

(Continued)

OTHER PUBLICATIONS

Stefanini—"Augmented reality in data centers;" Oct. 1, 2018; YouTube video; pp. 1-6; https://www.youtube.com/watch?v=2Jz6A-zjdgo (Year: 2018).*

(Continued)

*Primary Examiner* — Peter Hoang
(74) *Attorney, Agent, or Firm* — Ryan, Mason & Lewis, LLP

(57) ABSTRACT

In a computing environment comprising a plurality of equipment racks wherein each equipment rack comprises one or more of compute, storage and network assets, a method identifies a workflow attributed to at least a portion of the assets in at least one equipment rack of the computing environment, generates one or more overlays that visualize a projected impact to one or more components of the identified workflow, obtains a three-dimensional representation of the at least one equipment rack, and superimposes the one or more overlays on the three-dimensional representation of the at least one equipment rack.

20 Claims, 16 Drawing Sheets

(56) References Cited

U.S. PATENT DOCUMENTS

| | | | |
|---|---|---|---|
| 2012/0311260 | A1 | 12/2012 | Yamagiwa et al. |
| 2013/0031202 | A1 | 1/2013 | Mick et al. |
| 2013/0114100 | A1 | 5/2013 | Torii et al. |
| 2014/0025414 | A1 | 1/2014 | Worden et al. |
| 2014/0173474 | A1 | 6/2014 | Klemenz et al. |
| 2016/0140868 | A1* | 5/2016 | Lovett .................. G06T 19/006 434/118 |
| 2016/0196584 | A1 | 7/2016 | Franklin et al. |
| 2017/0017617 | A1 | 1/2017 | Sato et al. |
| 2017/0228161 | A1 | 8/2017 | Nangoh |
| 2017/0285943 | A1 | 10/2017 | Dalmatov |
| 2017/0285972 | A1 | 10/2017 | Dalmatov |
| 2017/0288945 | A1 | 10/2017 | Chandangoudar |
| 2018/0018822 | A1 | 1/2018 | Zagrebin et al. |
| 2018/0035606 | A1 | 2/2018 | Burdoucci |
| 2018/0158209 | A1 | 6/2018 | Fine et al. |
| 2018/0239991 | A1 | 8/2018 | Weller et al. |

OTHER PUBLICATIONS

Device42 Inc., "Device42 vs. BMC Discovery (formerly BMC ADDM)," https://www.device42.com/vs/bmc-discovery/, downloaded Sep. 23, 2019, 4 pages.

Unity Technologies, "GestureRecognizer," https://docs.unity3d.com/ScriptReference/SR.WSA.Input.GestureRecognizer.html, Sep. 16, 2019, 4 pages.

Unity Technologies, "Augmented Reality," https://unity.com/solutions/mobile-ar, 2019, 8 pages.

U.S. Appl. No. 16/530,034 filed in the name of James R. King et al. filed Aug. 2, 2019 and entitled "Dynamic Three-Dimensional Map Generation for Computing Environment."

Bluetooth Sig, Inc., "Service Discovery," https://www.bluetooth.com/specifications/assigned-numbers/service-discovery/, 2019, 18 pages.

opengarden.com, "The Internet of Us," https://www.opengarden.com/, 2018, 2 pages.

armystudyguide.com, "Find a Location Using Intersection," https://www.armystudyguide.com/content/army_board_study_guide_topics/land_navigation_map_reading/find-a-location-using-int.shtml, downloaded Jul. 30, 2019, 3 pages.

dev.ti.com, "Bluetooth Low Energy Angle of Arrival (AoA)," http://dev.ti.com/tirex/content/simplelink_academy_cc2640r2sdk_2_30_02_00/modules/blestack/ble_aoa/ble_aoa.html#expandable_-updated-aoa_receiver-c-aoa_receiver_cc2640r2lp_a1_app-, downloaded Jul. 30, 2019, 81 pages.

Wikipedia, "Direction Cosine," https://en.wikipedia.org/wiki/Direction_cosine, downloaded Jul. 30, 2019, 2 pages.

dev.ti.com, "Localization Toolbox," http://dev.ti.com/tirex/content/simplelink_cc2640r2_sdk_2_20_00_49/docs/blestack/ble_user_guide/html/localization/index.html, downloaded Aug. 1, 2019, 19 pages.

Sauli Lehtimäki, "Bluetooth Angle Estimation for Real-Time Locationing," https://www.silabs.com/whitepapers/bluetooth-angle-estimation-for-real-time-locationing, downloaded Aug. 1, 2019, 7 pages.

Wikipedia, "Gossip Protocol," https://en.wikipedia.org/wiki/Gossip_protocol, Jul. 17, 2019, 5 pages.

Wikipedia, "OSI Model," https://en.wikipedia.org/wiki/OSI_model, Jul. 17, 2019, 6 pages.

Intel Corporation, "Monitoring Media Wearout Levels of Intel Solid-State Drives," http://www.duo.co.nz/documents/SSD%20Media%20Wearout%20Levels.pdf, 2011, 2 pages.

U.S. Appl. No. 15/664,491 filed in the name of Muzhar Khokhar et al. filed Jul. 31, 2017 and entitled "System Health Awareness Using Augmented Reality."

U.S. Appl. No. 15/664,526 filed in the name of Ken Kim et al. filed Jul. 31, 2017 and entitled "Storage Device Monitoring Using Augmented Reality."

U.S. Appl. No. 16/518,507 filed in the name of Valerie Charry et al. filed Jul. 22, 2019 and entitled "Multi-Domain Monitoring Services for Intelligent Infrastructure Automation."

* cited by examiner

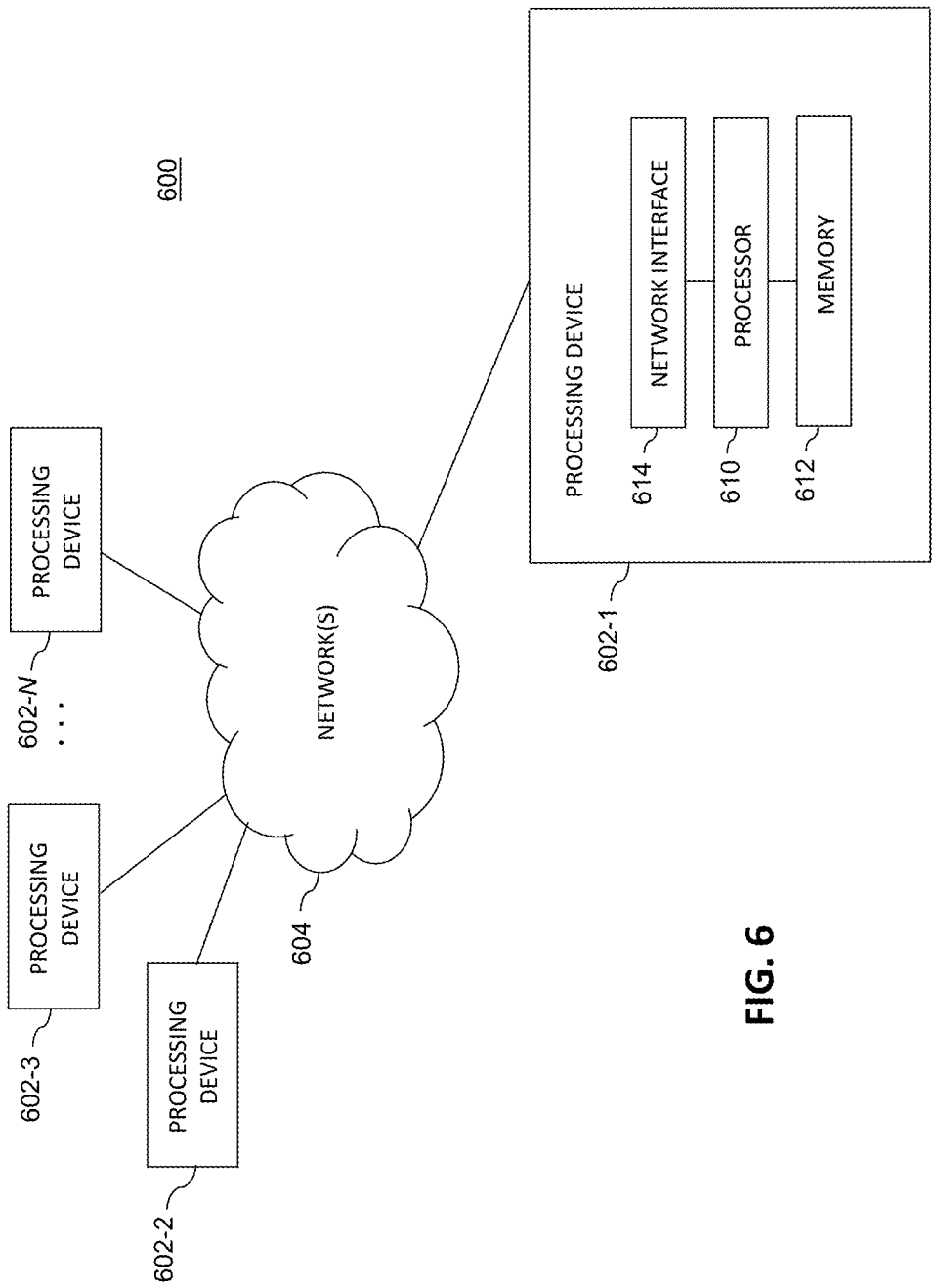

THREE-DIMENSIONAL MAP GENERATION WITH METADATA OVERLAY FOR VISUALIZING PROJECTED WORKFLOW IMPACT IN COMPUTING ENVIRONMENT

FIELD

The field relates generally to computing environments, and more particularly to techniques for generating metadata overlays on maps of such computing environments.

BACKGROUND

Data centers are computing environments that include compute, storage and network resources (assets) arranged in multiple rack-mounted enclosures (equipment racks or, simply, racks) placed at various locations within a physical space. Each rack may contain one or more of the compute, storage and networking assets, and the racks and their assets collectively constitute the data center. In some scenarios, a data center includes a cloud computing platform, where "cloud" refers to a collective computing infrastructure that implements a cloud computing paradigm. For example, cloud computing is a model for enabling ubiquitous, convenient, on-demand network access to a shared pool of configurable resources (e.g., compute, storage, network assets) that can be rapidly provisioned and released with minimal management effort or service provider interaction. The dynamic provisioning and interconnection of the various assets is accomplished while the various assets remain positioned in their respective racks. However, when physical infrastructure in a given data center has to be powered off or removed due to regular maintenance or failure, it is a significant challenge for data center personnel to know whether such actions will have a negative impact on software programs (e.g., applications) running on the data center.

SUMMARY

Embodiments of the invention provide techniques for generating one or more metadata overlays on a three-dimensional representation of a computing environment such as, for example, a three-dimensional map of a data center. The one or more metadata overlays visually represent a projected workflow impact associated with performing an action in the data center.

For example, in one embodiment, a method comprises the following steps. In a computing environment comprising a plurality of equipment racks wherein each equipment rack comprises one or more of compute, storage and network assets, a method identifies a workflow attributed to at least a portion of the assets in at least one equipment rack of the computing environment, generates one or more overlays that visualize a projected impact to one or more components of the identified workflow, obtains a three-dimensional representation of the at least one equipment rack, and superimposes the one or more overlays on the three-dimensional representation of the at least one equipment rack.

Advantageously, illustrative embodiments generate one or more metadata overlays on a dynamic three-dimensional map of a data center, wherein the metadata overlays provide a representation of end-to-end workflow impact prior to certain actions (e.g., infrastructure power down, failure, replacement, etc.) occurring in the data center.

These and other features and advantages of the invention will become more readily apparent from the accompanying drawings and the following detailed description.

BRIEF DESCRIPTION OF THE DRAWINGS

FIG. 6 illustrates a processing platform used to implement an architecture for generating workflow impact overlays on maps of computing environments, according to an embodiment of the invention.

DETAILED DESCRIPTION

Figure 1:
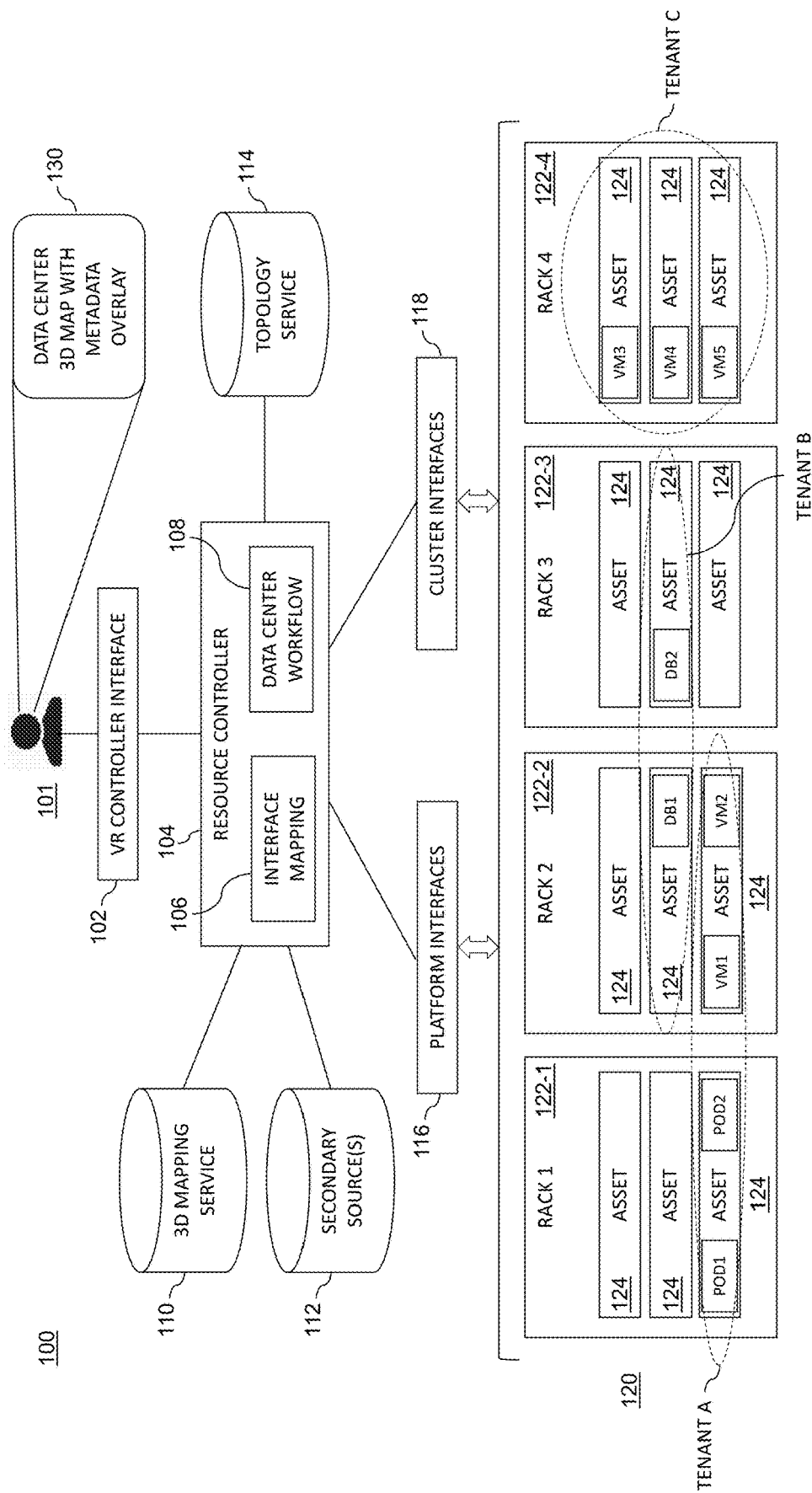
FIG. 1 is a block diagram of an architecture for generating metadata overlays on maps of a computing environment, according to an embodiment of the invention.

Illustrative embodiments may be described herein with reference to exemplary computing environments, cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As mentioned above in the background section, when physical infrastructure in a data center has to be powered off or removed due to regular maintenance or failure, or some other infrastructure-affecting action has to be performed, data center personnel (e.g., IT administrators) are hesitant to make changes to the infrastructure or initiate automated actions without being able to understand the impacts of the changes. Examples of initiating automated actions include, but are not limited to, software proactively migrating workloads based on a state setting change, or a hypervisor or other virtualization manager initiating a shutdown request based on the IT administrator setting an asset state change. More particularly, when managing infrastructure, prior to turning off a server or removing a drive, IT administrators would like to make sure that their actions will not have a negative impact on workflows involving business critical applications.

While some of the many individual infrastructure assets in the data center may have dedicated software interfaces that enable a user to respectively log in and try to obtain a projected impact assessment, one main drawback is that there is no ability for the user to obtain and consume projected impact information in real-time while the user is physically standing in the data center by the equipment that is to be shut down and/or replaced.

Illustrative embodiments overcome the above and other drawbacks by providing a solution that generates an on demand visualization (one or more metadata overlays over an image of a data center) of workflow associated with one or more assets in the data center. In illustrative embodiments, the visualization is available on a handheld device of an IT administrator (e.g., smart phone, tablet, etc.) while the user is standing or otherwise physically located in the data center. With such a solution, the IT administrator can understand the consequences of their actions in a user-friendly way before they take the actions. The metadata overlay of projected impacts and behavior metadata (inclusive of, but not limited to, metadata reflecting platform, application, workload, virtual machines, container, pods, databases, etc.) provides a visual representation of end-to-end workflow prior to the actions occurring. By way of example only, illustrative embodiments enable the visualization of predicted/projected movement of virtual machines, pods, or databases projected onto a representation of one or more equipment racks of a data center. Such a representation, in various embodiments, can be a real-time image of the equipment racks (augmented reality (AR) or virtual reality (VR) environment) and/or a stored image of the equipment racks. The visual representation of the racks with metadata overlays can be presented on smart devices, mobile AR/VR interfaces, or even the wall of the data center itself. Illustrative embodiments further enable intelligent decision-making based on proposed changes during hands-on infrastructure management using smart devices inclusive of, but not limited to, watches, phones, tablets, headsets, projection technologies, and other AR/VR devices.

A "workflow," as illustratively used herein, refers to a set of one or more software-related tasks in a data center that are performed to provide a particular data center service or process.

A "pod," as illustratively used herein, refers to a point of delivery module of network, compute, storage, and application components that operate together to deliver one or more services or processes in a data center.

More particularly, illustrative embodiments enable a user to view a three-dimensional topology overlay of metadata available within the data center and the potential projected impact of making changes on the physical infrastructure grouped by known, useful sets, inclusive of but not limited to, hardware utilization, platforms, applications, communication paths, etc.

For example, based on an application topology, a data visualization with overlays can be projected in real-time on racks, rack contents, and all assets. By utilizing secondary data within existing platform and application management technologies, illustrative embodiments enable physical visualization of projected asset utilization and component movement over time with the use of a smart device.

That is, standing at any point in the data center, the user is able to point their smart device at a rack. They can then choose the action they would like to take (e.g., power down a server) and illustrative embodiments overlay the metadata visualization of the projected impact on the data center and workloads. Secondary data sources provide an indication of the asset to be investigated, and a map is displayed to the in-house data center administrator.

Advantageously, illustrative embodiments provide utilization of AR and metadata overlays to show projections of potential impacts on topology based on selected behaviors utilizing secondary source data. Illustrative embodiments can be utilized by data center administrators in real-time to show what would happen to applications should they choose to perform actions against the infrastructure, and utilizes location-aware display technologies eliminating time-intensive logins through a prohibitive number of management portals, navigation and laptop access requirements.

As will be further explained, indoor positioning technologies broadcast object location, with membership specification supplying the object type. Smart devices can determine the broadcast object which is closest to the device relative to other devices. For example, a user can stand in front of rack 1, aisle 2, data center 3, and see via the visualization including metadata overlaid on the three-dimensional map presented on his/her smart device that this particular rack is running ten servers. On server 3, the user is informed via the visualization that server 3 is running a specific hypervisor, and that the server is part of a cluster also including server 4. Further, the user is informed via the visualization about the ten virtual machines (VMs) that are currently running on both of these servers and the applications to which they are tied.

Turning now to FIG. 1, an architecture 100 for generating one or more metadata overlays on a map of a computing environment is depicted, according to an illustrative embodiment. As shown, a user 101 is located in a data center in the vicinity of a set of equipment racks 120 of the data center, wherein each equipment rack 122-1, 122-2, 122-3 and 122-4 comprises a plurality of assets 124 (e.g., compute, storage and/or network assets). A data center 3D map with metadata overlays 130 is generated and presented to the user 101 via a VR controller interface 102 coupled to a resource controller 104, which itself includes an interface mapping module 106 and a data center workflow module 108, coupled to a 3D mapping service 110, secondary source(s) 112, a topology service 114, one or more platform interfaces 116 and one or more cluster interfaces 118.

In this example, it is assumed that one of the assets in rack 122-1 and one of the assets in rack 122-2 currently host components provisioned for one or more applications of Tenant A, i.e., POD1 and POD2 are running on the bottom asset 124 positioned in rack 122-1, while VM1 and VM2 are running on the bottom asset 124 positioned in rack 122-2. Further, it is assumed that one of the other assets in rack 122-2 and one of the assets in rack 122-3 currently host components provisioned for one or more applications of Tenant B, i.e., DB1 is running on the middle asset 124 positioned in rack 122-2, while DB2 is running on the middle asset 124 positioned in rack 122-3. Lastly, it is assumed that assets in rack 122-4 currently host components provisioned for one or more applications of Tenant C, i.e., VM3, VM4 and VM5 are respectively running on the three assets 124 positioned in rack 122-4. It is to be appreciated that the numbers of racks and assets depicted in FIG. 1 are for illustration purposes only and that a computing environment in which illustrative embodiments are implemented may alternatively include more or less racks and assets, more or less components, and different components than the ones shown.

Effectively by combining infrastructure information obtained from the set of racks 120 through platform interfaces 116 and workflow information obtained from components running on the assets through cluster interfaces 118, the interface mapping module 106 and data center workflow module 108 of resource controller 104 utilize the 3D mapping service 110, secondary source(s) 112 and topology service 114 to generate the data center 3D map with metadata overlays 130. As will be further explained below, the metadata overlays of the visualization (130) presented to user 101 reflect a projected impact to the various components (POD1, POD2, DB1, DB2, and VM1 through VM5) that a given infrastructure action (e.g., asset shutdown/replacement) would cause. This projected impact would be used by the user and/or other data center personnel to decide whether or not to take that action or to alter the action.

One or more illustrative embodiments include technologies and approaches as follows:

Application Definition: ability to correlate disparate workloads and assets to form "application definitions." This is a known process which utilizes a combination of labels/tags and network traffic patterns to correlate disparate workloads, VMs, etc., as members of a named application across platforms/clouds/and bare metal. This enables the correlation of workloads to each other for purposes of visualization.

Platform Definition: ability to correlate all physical components utilized by a platform (e.g., VMware cluster, Kubernetes Nodes, AWS cluster). This enables the visualization of impacted platforms.

Ownership definition: ability to correlate access rights to a platform, or subcomponents of a platform with domain names or other metadata tags. This is utilized by application impact projection technologies used in data center planning and management technologies such as VMotion. This enables the projection of locations which workloads would move to based on changes in infrastructure.

Network traffic monitoring and mapping: ability to trace access points and correlate them to and using secondary data sets, correlate IP addresses, correlating to physical hardware locations. This enables path projections in the instance of workload movement.

Asset impact projection: ability for platforms to project potential impact of changes across managed assets.

Figure 2:
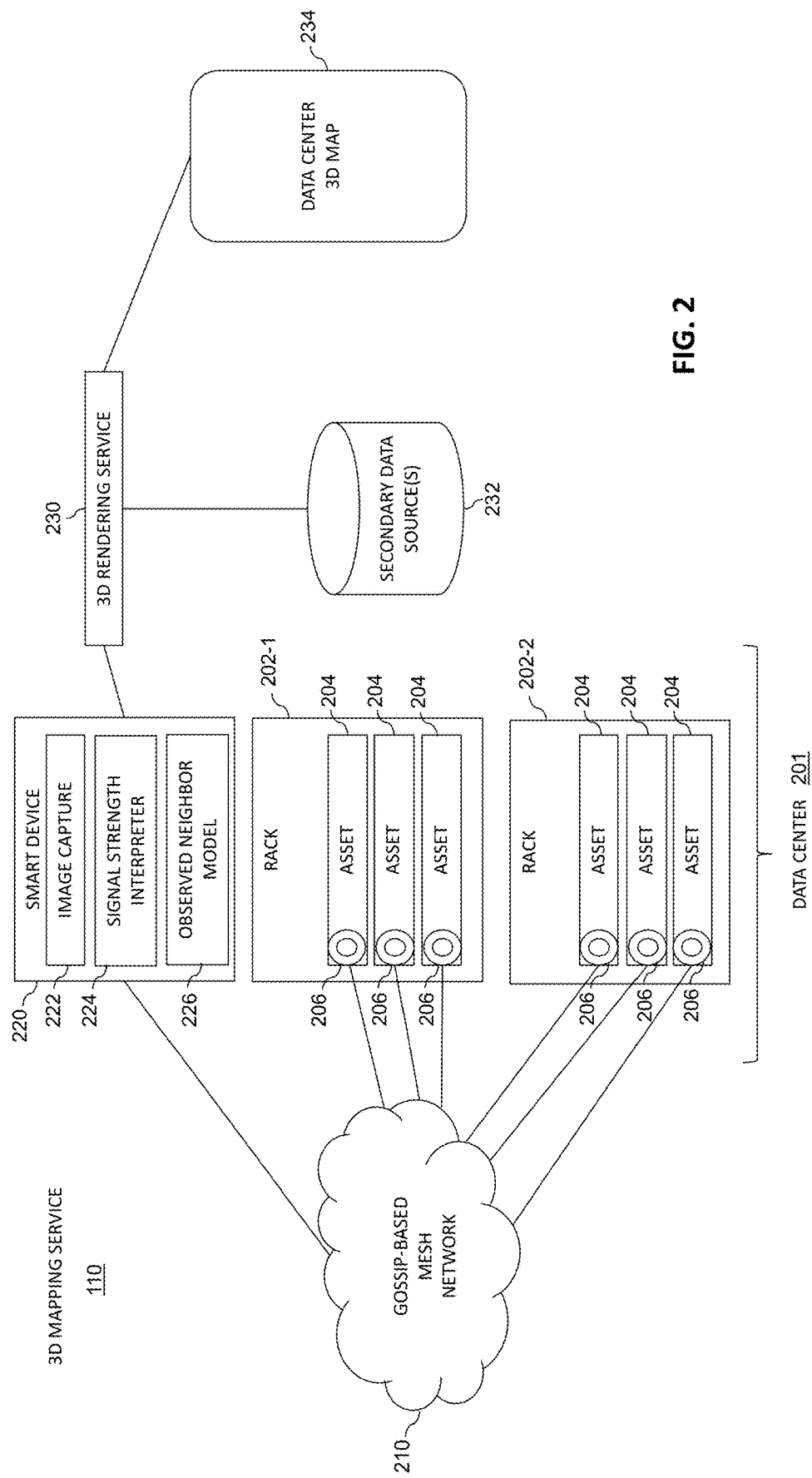
FIG. 2 is a block diagram of an architecture for a map generating service for a computing environment, according to an embodiment of the invention.

In one illustrative embodiment, 3D mapping service 110 generates three-dimensional map of a data center. That is, FIG. 2 depicts an architecture for a dynamic map generating service for a computing environment (e.g., 110), according to an embodiment of the invention. By combining several functionalities, illustrative embodiments enable the generation of a 3D map of a data center by standing in a single location with a smart device. Such functionalities include, but are not limited to the following:

(i) Smart devices can determine measurements of objects based on an image utilizing relative sizing of known elements. These techniques are readily available in application programs and through smart calculations based on known object size and relative dimension extrusion.

(ii) Indoor positioning technologies can broadcast object location, with membership specification supplying the object type. Smart devices can determine the broadcast object which is closest to the device relative to other devices.

(iii) Modern servers/arrays and data center physical assets are typically shipped and tracked with broadcasting/beacon technology (inclusive of, but not limited to, Bluetooth, RFID, and other broadcasting technologies) as part of manufacturing practices. These beacons have a unique identifier enabling correlation of one signal to one asset.

Thus, as will be further explained herein, illustrative embodiments perform correlation of the location where an image was taken, with relative location of received indoor positioning technologies and combined with a gossip-based mesh network map out an entire data center by standing in a single location. The map is 3D in that each rack and asset is rendered in X, Y, Z coordinates (e.g., length, width, height dimensions). An example of building a 3D map using the techniques described herein will be described in further detail below with respect to FIGS. 4A-4E.

Illustrative embodiments enable a user to near-instantly generate an entire 3D map of their data center, inclusive of racks, rack contents, and all assets. Illustrative embodiments also enable ongoing tracking of assets and components over time. These features leverage advancements in peer discovery, indoor positioning systems, broadcast networks, and image recognition and manipulation on smart devices. Examples of smart devices include, but are not limited to, smart phones, tablets, laptops, smart headsets, smart glasses, etc.

For example, standing at any point in the data center, the user is able to point their smart device camera at a rack or row of racks. The smart device takes a single still-frame moment in time of the assets and using a known object in the picture accurately determines the physical characteristics of the closest rack (inclusive of width and height, proximity to racks next to it and distance from other objects). This defines what will be used as Data Center Position (0,0,0) of Rack0 (including length, width, height).

The same smart device taking that photo also acts as a receiver of indoor positioning broadcast data. Each asset in the data center is equipped with a positioning beacon (e.g., Bluetooth, RFID, or other broadcasting technologies). Utilizing the received signal strength (RSS) from these beacon signals and secondary data source(s), illustrative embodiments automatically determine the closest asset, defined as Asset0 in Rack0. Correlation with secondary data enables the population of the exact device serial number and physical characteristics.

To determine the remaining contents of the rack, illustrative embodiments leverage peer discovery (i.e., the ability of a device to find other similar devices that are in the immediate physical vicinity, i.e., proximity) via a gossip-protocol overlay on top of a mesh network. By having each device serve as a sensor, an observed neighbor model is built with RSS for each neighboring node. When combined with an Angle of Arrival (AoA) implementation, this provides relative proximity in the X, Y, and Z axis. This provides a build-out of relative location of the contents of the first rack.

A gossip-based network is a distributed network of peer devices (in illustrative embodiments, assets with beacons) that is configured to enable peer-to-peer communication that is based on the way gossip is spread. That is, the distributed network uses peer-to-peer transfer of data to ensure that the data is routed to all members of the ad-hoc network. In some cases, the ad-hoc network is a mesh network. A mesh network is a network topology in which the devices connect directly, dynamically and non-hierarchically to as many other devices as possible and cooperate with one another to efficiently route data therebetween. AoA measurement is a method for determining the direction of propagation of a signal or determined from signal strength. In some examples, AoA determines the direction by measuring the time difference of arrival and from these delays the AoA can be calculated.

The smart device then near-instantly provides a 3D rendering of the closest rack and its contents. This 3D rendering can then be expanded within the mesh overlay to build out a model of the remaining assets in the data center. In some scenarios, the first rack build-out only focuses on Y axis relative location data ("higher" or "lower") but with X axis proximity and the smart device measurement data, inference of assets in adjacent racks can be discovered. This process is repeated until all assets in the data center are discovered and modeled.

With secondary data checks on the assets, serial data association can then be performed to ensure that asset sizes are in line with width and height expectations of each asset (e.g., 1 U versus 4 U servers). When combined with the RSS, it can then be inferred from minimal user input what relative rack-unit each asset is located in. In some embodiments, the minimal user input requires a user to provide the location of at least one "anchor" asset. Given the anchor asset, the locality capabilities described herein may be used to determine the relative location of other assets. The anchor asset or assets may be any random sampled assets. Thus, the minimal user input may include providing an indication that at least one random asset is in a particular location. In some embodiments, the location may be defined in terms of an "actual rack" and "rack-unit" where the actual rack refers to a datacenter rack cabinet giving a relative position in an overall room (e.g., "x" and "y" axis coordinates) and the rack-unit refers to the position within the datacenter rack cabinet (e.g., a "z" axis coordinate). The user would only need to provide the actual rack and rack-unit of additional random sampled assets to start getting more and more accurate mapping. The result is a model of all assets in the data center that can then be provided to a 3D rendering service that maps the data center.

Advantageously, a single location visual indicator on a smart device combined with proximity and a gossip-based mesh network is able to generate a data center map, inclusive of rack layouts and secondary data sources. Illustrative embodiments utilize a smart device to correlate a single physical location with object measurements, a 0,0,0 (X, Y, Z) located beacon and combined with a mesh broadcasting network of three-dimensional beacon data to map an entire data center and its contents standing in one spot. Further, with illustrative embodiments, broadcast mesh network continuous topology updates are available. That is, utilizing illustrative embodiments, it is possible to track the change in signals over time. Movement of physical assets are correlated to changes in nearest-neighbors. Removal, or physical asset failures, can be correlated to beacon silence. The ongoing topology updates can then be mapped in relation to the data center anchor point (Rack0, Asset0, Pos0).

Turning now to FIG. 2, an architecture is depicted for generating dynamic 3D maps of data centers, in accordance with illustrative embodiments as described herein. Note that the map generating architecture in FIG. 2 depicts an exemplary data center similar to the data center in FIG. 1. Thus, it can be assumed that any description and components mentioned in the context of the data center in FIG. 2 are present in illustrative embodiments of the data center in FIG. 1. For example, assets 124 in FIG. 1 are similarly configured as assets 206 to be discussed below in the context of FIG. 2, i.e., assets 124 have positioning beacons operatively coupled to form a gossip-based mesh network.

As shown, a data center 201 comprises two equipment racks 202-1 and 202-2. It is to be appreciated that this number of racks is for illustrative purposes and typical data centers with which map generation in accordance with illustrative embodiments is performed include more than two equipment racks. Each rack comprises a plurality of assets 204 (compute, storage, network assets) and each asset 204 has a positioning beacon 206 installed thereon or therein. The positioning beacons 206 are part of (peers in) a gossip-based mesh network 210 which is also operatively coupled to a smart device 220 operated by a user (e.g., user 101 in FIG. 1). Smart device 220 includes an image capture module 222 (e.g., cellular phone camera), a signal strength interpreter 224 and an observed neighbor model 226. The smart device 220 is operatively coupled to a 3D rendering service 230 which is operatively coupled to a secondary data source(s) 232. The 3D rendering service generates a data center 3D map 234 (e.g., part of the visualization 130 depicted in FIG. 1).

As mentioned above, standing at any point in the data center 201, the user points image capture module 222 of smart device camera 220 at rack 202-1 or 202-2 (in some embodiments, the camera can be pointed at both racks 202-1 and 202-2). The image capture module 222 takes a single still-frame image of the rack (202-1 or 202-2) and its assets 204. Using a "known object" in the captured image accurately determines the physical characteristics (inclusive of width and height, proximity to racks next to it and distance from other objects) of the closest rack to which the user is positioned. As explained, this location defines what will be used as Data Center Position (0,0,0) of Rack0 (including length, width, height).

The "known object" may be a server in a rack. The smart device 220 participates in the gossip-based mesh network 210, and therefore understands its relative distance to the server or other known object within the rack. Using that distance estimation (e.g., from the smart device 220 to the server or other known object), RSS and the characteristics of the server or other known object (e.g., the size of the server) allows for determining the physical characteristics of the closest rack. For example, from the single still-frame image of the rack and the RSS to the server or other known object, it can be determined that the smart device 220 is 4 feet (ft) from the server or other known object at a 27 degree angle. It is assumed that physical characteristics such as the size of the server or other known object are available (e.g., that the server is 1 U (1 RU), meaning that it is 1.25 inches tall and 19 or 23 inches wide depending on the rack). The size and other physical characteristics of the server or other known object may be verified by using a serial number look-up to obtain model details for the server or other known object. Based on pixel measurements and taking into account the angles from an internal measurement unit of the smart device 220, the size of the closest rack may be inferred (e.g., as there are nearly 13 data points available for assessing the size of assets in the image).

Further, signal strength interpreter 224 of smart device 220 acts as a receiver of indoor positioning broadcast data from the positioning beacons 206 that are part of the gossip-based mesh network 210. Based on a comparison of the RSS values of the received beacon signals, signal strength interpreter 224 determines the closest asset to the smart device 220. As mentioned, in some embodiments, secondary data from source(s) 232 enables the population of the exact device serial number and physical characteristics of the closest asset. For example, once the smart device 220 determines what it considers a closest asset, secondary data such as a serial number and physical dimensions of the asset can be retrieved from an equipment database (source 232) that maintains that information.

To determine the remaining contents of the rack with the closest asset, the smart device 220 leverages peer discovery via a gossip-based mesh network 210. An observed neighbor model 226 is built with RSS for each neighboring node. A "neighboring node" refers to other assets participating in the gossip-based mesh network 110. When combined with an Angle of Arrival (AoA) implementation, this provides relative proximity in the X, Y, and Z axis. In some embodiments, it is assumed that each asset or neighboring node has an associated neighbor table with RSS and AoA information. Multiple assets may be queried for their associated neighbor tables to perform an overlay. Consider, for example, two antenna arrays (associated with two assets) set perpendicular to each other in Euclidean space. Each antenna array performs a simultaneous phase shift based calculation of $\theta = \sin^{-1}(\lambda\phi/2\pi d)$, where $\theta$ is the AoA, $\lambda$ is the wavelength, $\phi$ is the phase shift between two antennas, $\pi$ is Pi, and d is the distance between the two antennas. The phase shift-based calculations of $\theta$ may be used to give a 3D vector, which should be phase shifted based on internal measurement readings of the smart device 220 (e.g., readings of a gyroscope of the smart device 220). The servers or other assets are assumed to be equipped similarly for performing the phase shift calculations. The assets, however, are not required to include a gyroscope in cases where the standard orientation of the asset is static (e.g., a server in a rack). Each of the assets can then store a direction cosine, standardizing the relations to a relative angle. Thus, a request between two endpoints or assets allows for an indication of relative positioning (e.g., "I am 3 feet in front, 2 feet up, and 1 foot left of you") to be communicated via beaconing. This provides a build-out of relative location of the contents of the first rack.

The smart device 220 then near-instantly provides a 3D rendering of the closest rack and its contents using 3D rendering service 230. In some embodiments, the rendering service 230 is resident on the smart device 220, while in other embodiments, service 230 is fully or partially remote from the smart device 220. This 3D rendering can then be expanded within the mesh overlay to build out model 226 of the remaining assets in the data center. The first rack build-out only focuses on Y axis relative location data ("higher" or "lower") but with X axis proximity and the smart device measurement data, inference of assets in adjacent racks can be discovered. This process is repeated until all assets in the data center are discovered and modeled, and data center 3D map 234 is completed. Note that map 234 can be presented on the smart device 220 and/or on some other computer system. Note also that the rendering service 230 can be part of the smart device 220, remote from the smart device 220, or some combination thereof. Also, in alternative embodiments, model generation can be fully or partially remote from the smart device 220.

It is to be appreciated that the 3D map generated using architecture of FIG. 2 is one example of a representation of assets in a data center on which metadata overlays generated in accordance with architecture 100 of FIG. 1 are superimposed. Thus, techniques for generating one or more metadata overlays on a three-dimensional representation of a computing environment are not limited to a map generated in accordance with the FIG. 2 embodiment.

Figure 3:
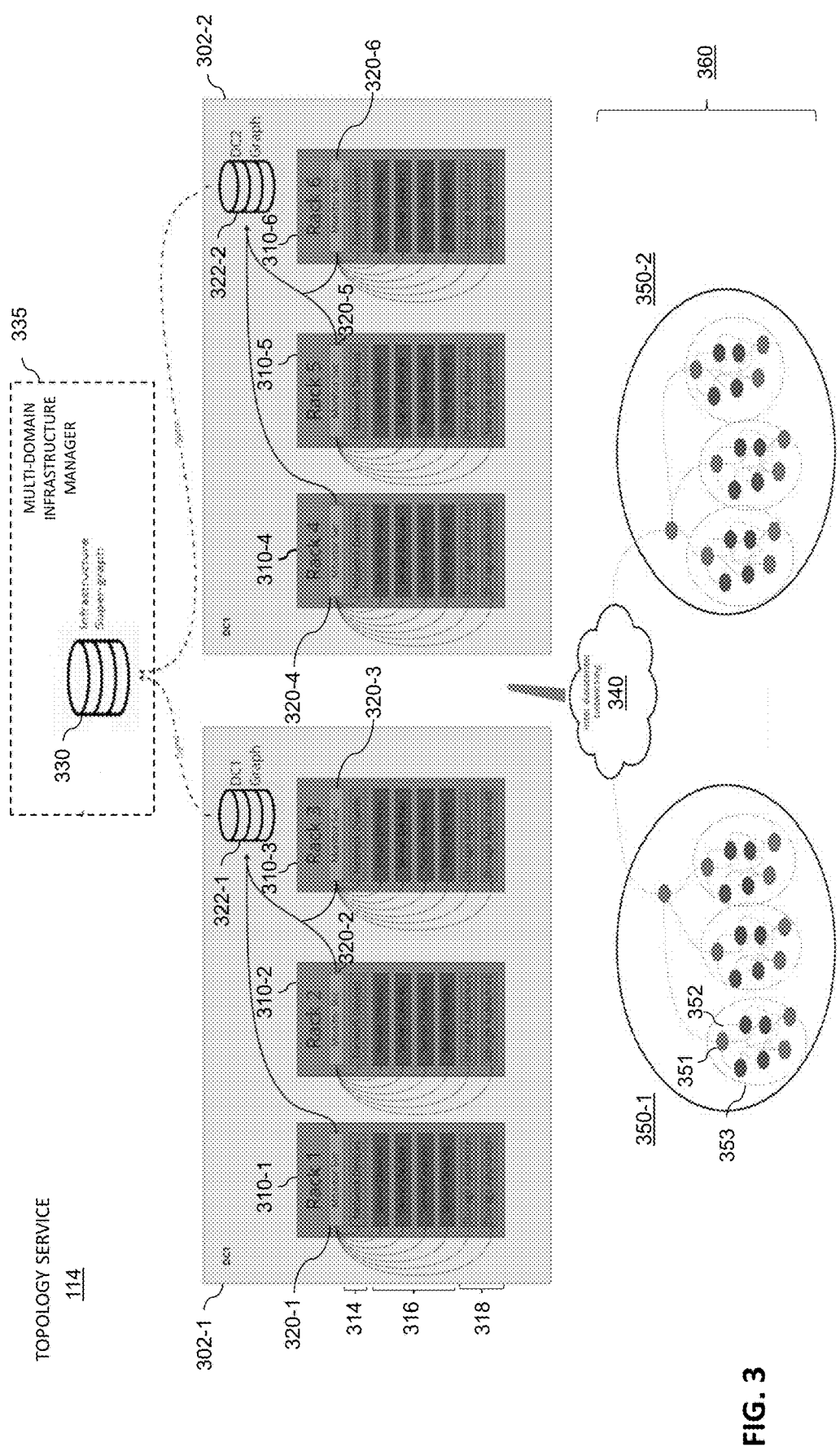
FIG. 3 is a block diagram of a topology management service for a computing environment, according to an embodiment of the invention.

In one illustrative embodiment, topology service 114 generates a topology of a data center. That is, FIG. 3 depicts an architecture for a topology service for a computing environment (e.g., 114), according to an embodiment of the invention. The topology service 114 provides automated infrastructure management in a computing environment. More particularly, illustrative embodiments leverage graph theory concepts, semantics, and algorithms, modeling multi-domain infrastructure systems as vertices and edges in a graphical representation. Such graphs present information in a format that is query-able and provide a more complete view of the state of a data center in order to improve the efficiency when performing management operations. This representation of a data center also enables the application of graph algorithms across domains and provides an efficient way to calculate costs in a data center.

In one or more illustrative embodiments, disaggregated monitoring services are deployed across the data center to feed the overall graph state. Both temporal and spatial data points are collected by the services to provide a near consistent view of the entire data center infrastructure at any given point in time. Observability is paramount to the overall graph quality. In one or more illustrative embodiments, when referring to temporal data points versus spatial data points, it is a differentiation between time-series data (things that change over time and thus are considered temporal) versus inventory data (things that do not change or change infrequently and thus are considered spatial). Sample temporal data may include, but is not limited to, data points comprising: performance data/metrics (e.g., utilization, per second measurements, etc.); power utilization data; monitoring data (e.g., voltage, temperature, error states). Sample spatial data may include, but is not limited to, data points comprising: location data (e.g., geographic with latitude/longitude to enable polar coordinate calculations); serial numbers; part numbers; inventory data (e.g., child devices, current software versions, etc.); state inventory data (e.g., current operating system, current applications—this could be temporal in some instances).

A superset graph (super-graph) is maintained that is a composition of individual site sub-graphs. The individual site sub-graphs focus on lower layers of infrastructure to the Open Systems Interconnection (OSI) Network Model (primarily layer 1 & layer 2). Layers 3+ are maintained within the superset graph which facilitates multi-data center deployments and stretched cluster concepts with minimal effort beyond an observer that links the native technology to specific spatial boundaries.

Further, in terms of temporal data sets, utilization data is collected and assigned to all vertices and edges within the context of that technology space. The data itself is aggregated and summarized into cross-domain weights that facilitate contextual traversals based on higher-order use cases. For example, in one or more embodiments, cross-domain weight assignment is an aggregate value determined from compressing all graph layers into one view. A sample graphing algorithm is A* or Djikstra's Algorithm which does path cost minimization across a two-dimensional graph. Performance of such algorithms includes a compression of layers into these cross-domain weights and then allowing a sub-graph traversal to occur. The weight is arbitrary/implementation-specific but the feeders are expressed below. An example would be how to effectively highlight limiting factors. A network connected storage device may report a utilization of 50% but the underlying network connection may report a utilization of 100%. The cross-domain utilization report would be 100% since the dependency would be discernable in the graph and the limiting factor could be presented for a raw performance scenario.

This infrastructure monitoring combined with contextual relationship data in graph format enables powerful queries and traversal mechanisms.

Additional layering of the data with application context provides instant answers to the ramifications of network outages and even determine potential redundancy concerns within a data center. The overall query power for infrastructure becomes practically limitless.

Still further, in one or more illustrative embodiments, during graph queries and traversals, ideal subgraphs are near instantly generated via existing storage snapshot technologies to ensure a consistent state of the infrastructure. Illustrative embodiments also align a subgraph locking mechanism to fence (or lock) infrastructure from change during query and action steps.

FIG. 3 is a block diagram of a computing environment with automated infrastructure management functionality in a computing environment, according to an embodiment of the invention. As shown, a first data center 302-1 is operatively coupled to a second datacenter 302-2. The two data centers 302-1 and 302-2 are coupled by inter data center networking 340. Note that in relation to the data center referenced in FIG. 1, the computing environment in FIG. 3 is intended to illustrate a topology service that can be applied to the data center of FIG. 1 through topology service 114. Thus, it can be assumed that any description and components mentioned in the context of the data center(s) in FIG. 3 are present in illustrative embodiments of the data center in FIG. 3. For example, assets 124 in FIG. 1 are similarly configured as assets to be discussed below in the context of FIG. 3.

The infrastructure of the first data center 302-1 comprises three racks 310-1 (Rack 1), 310-2 (Rack 2) and 310-3 (Rack 3). Each rack comprises one or more network devices 314, one or more server devices 316 and one or more storage appliances 318. Compute, storage and network components (assets) 314, 316, 318 from each rack report to a monitoring service 320 (320-1 in Rack 1, 320-2 in Rack 2 and 320-3 in Rack 3). Each monitoring service 320 sends data to a graph generation engine 322-1. Graph generation engine 322-1 generates a graph 350-1 from the infrastructure monitoring data received from the various monitoring services 320-1, 320-2 and 320-3. For example, within graph 350-1 (which may be considered a relative flattened topology view), each compute, storage and network component 314, 316, 318 is represented by a vertex 351 wherein two vertices are interconnected by an edge 352. Each rack 310-1, 310-2 and 310-3 is represented as a larger circle 353. Graph generation engine 322-1 synchronizes with an infrastructure super-graph generation engine 330. By synchronize, in illustrative embodiments, it is meant that the graph generation engine 322-1 provides the sub-graph generated locally at the data center 302-1 to infrastructure super-graph generation engine 330.

Similarly, the infrastructure of the second data center 302-2 comprises three racks 310-4 (Rack 4), 310-5 (Rack 5) and 310-6 (Rack 6). Each rack comprises one or more network devices 314, one or more server devices 316 and one or more storage appliances 318. Compute, storage and network components 314, 316, 318 from each rack report to a monitoring service 320 (320-4 in Rack 4, 320-5 in Rack 5 and 320-6 in Rack 6). Each monitoring service 320 sends data to a graph generation engine 322-2. Graph generation engine 322-2 generates a graph 350-2 from the infrastructure monitoring data received from the various monitoring services 320-4, 320-5 and 320-6. The vertices and edges in graph 350-2 (which may be considered a relative flattened topology view) represent the components in the second data center 302-2 in a similar manner as explained above for graph 350-1. Graph generation engine 322-2 synchronizes with the infrastructure super-graph generation engine 330. By synchronize, in illustrative embodiments, it is meant that the graph generation engine 322-2 provides the sub-graph generated locally at the data center 302-1 to infrastructure super-graph generation engine 330.

Note that 350-1 and 350-2 are subgraphs and together (as depicted in FIG. 3) they represent a flattened topology super-graph 360 generated from the subgraphs by infrastructure super-graph generation engine 330.

Note that, in some embodiments, infrastructure super-graph generation engine 330 can be implemented in its own computing device remote from either data center 302-1 or 302-2, and in other embodiments, it can be implemented in one of the data centers or across both data centers. Note further that the infrastructure super-graph generation engine 330 is part of a multi-domain infrastructure manager 335 in illustrative embodiments.

Note also that while FIG. 3 shows only two data centers and only three infrastructure racks in each data center, it is to be understood that this is for illustrative purposes and thus embodiments are not so limited and apply to computing environments with more or fewer data centers and racks/components therein.

As mentioned above, monitoring services 320 are disaggregated monitoring services deployed across the computing environment to feed the overall graph state. Both temporal and spatial data points are collected by the monitoring services 320 from the compute, storage and network components (314, 316 and 318) to provide a near consistent view of the given data center at any given point in time. Infrastructure super-graph generation engine 330 obtains synchronized data from each graph generation engine 322 to generate and maintain a super-graph that is a composition of individual data center sub-graphs. In some embodiments, the individual data center sub-graphs focus primarily on OSI layer 1 and layer 2, while OSI layers 3+ are maintained within the superset graph. Further, as mentioned above, utilization data is collected and assigned to all vertices 351 and edges 352 within the context of that technology space. The data itself is aggregated and summarized into cross-domain weights that facilitate contextual traversals based on higher-order use cases.

As mentioned above, infrastructure monitoring combined with contextual relationship data in graph format enables powerful queries and traversal mechanisms. Thus, for example, an IT operator or system queries infrastructure super-graph generation engine 330 to access one or more graphs and to effectuate one or more graph operations.

In illustrative embodiments, topology service 114 is utilized as a correlation engine wherein the full set of asset data is gathered from the beacons, then the topology discovery service is used to identify the availability of assets within the domain and 3D mapping service 110 is used for non-transient data such as platform type. Through the topology service 114, a determination is made as to which assets have which platforms and therefore the call made into the platform and cluster interface is optimized. The topology service acts as supplemental data.

Figure 4A:
FIGS. 4A-4I illustrate generation of a three-dimensional map of a computing environment and associated workflow impact overlays, according to an embodiment of the invention.
Figure 4B:
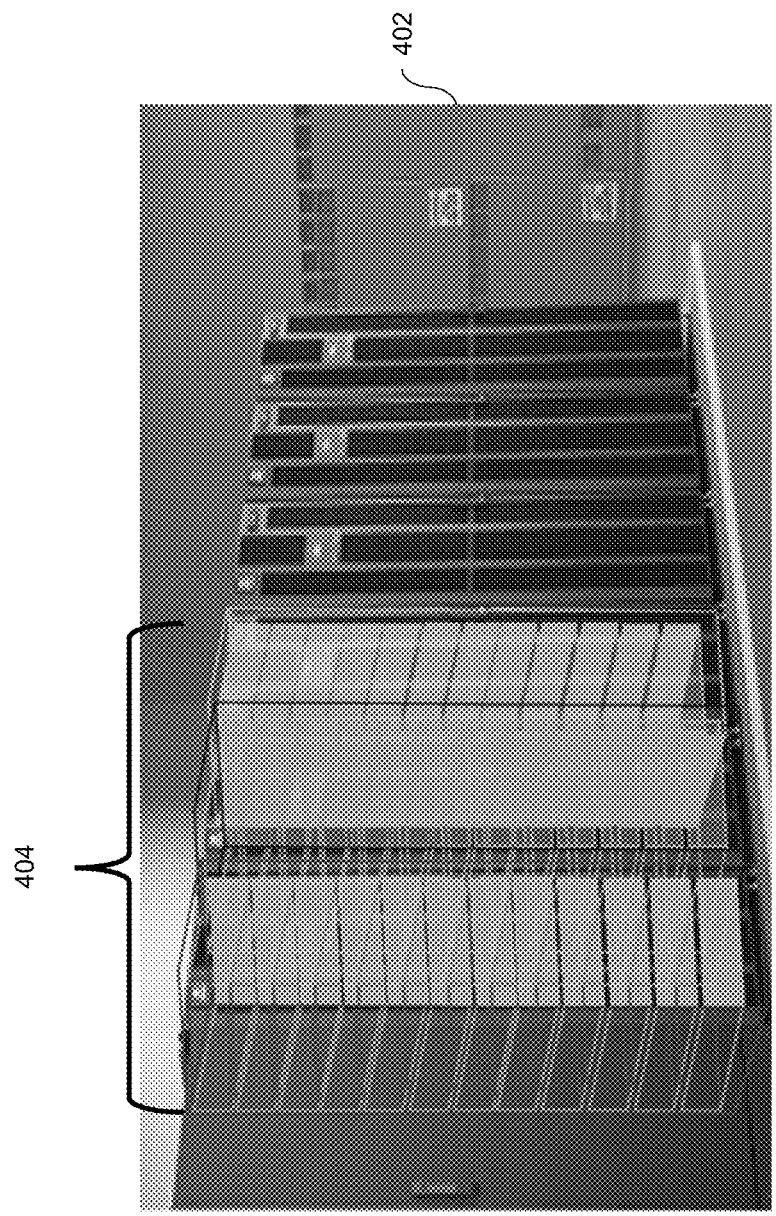

FIGS. 4A-4I depict an example of building a 3D map with metadata overlays for a portion of a data center. FIG. 4A shows an image 400 of a closed physical data center rack. The image 400 may be captured by the smart device 220 using image capture module 222. FIG. 4B illustrates an image 402, which shows the closed physical data center rack from image 400 as well as three additional racks 404 that are populated. Using broadcasting/beaconing technology such as Bluetooth, it is determined that additional assets exist in the data center shown in image 400. In this case, it is assumed that such additional assets are racks and servers. The image 400 may thus be augmented as shown in FIG. 4B. Thus, the image in FIG. 4B is an augmented image 402, where three additional racks 404 are populated in the image 400. Each of the additional assets detected using the broadcasting/beaconing technology is represented as a box in one of the three additional racks 404.

Figure 4C:
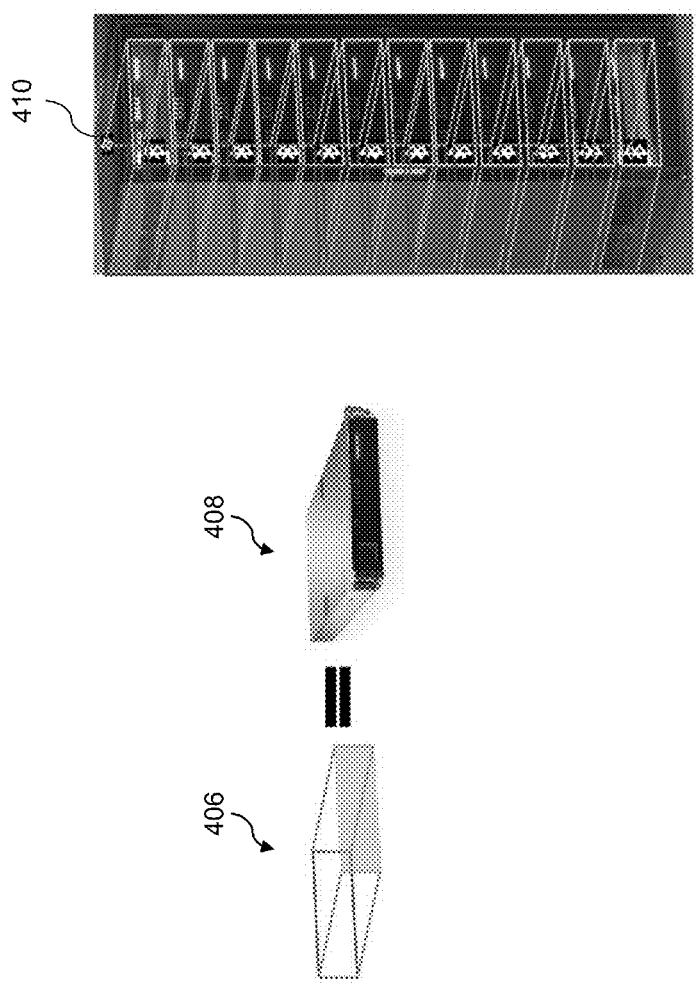
Figure 4D:
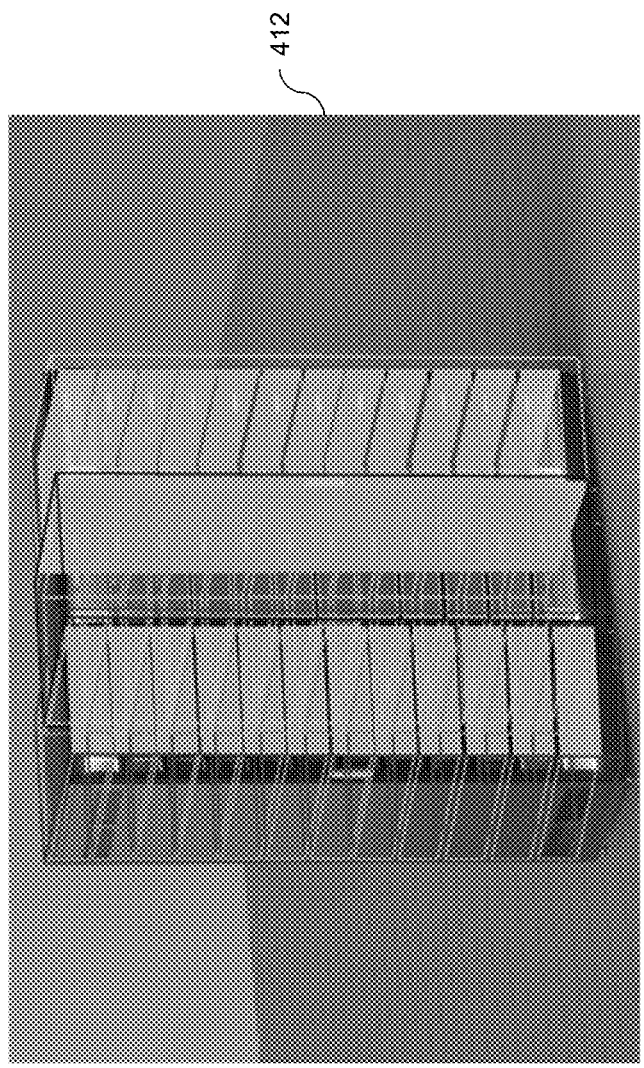

Secondary sources may be used to correlate assets to a type of server or other hardware that the asset represents. In FIG. 4C, it is determined that a particular asset 406 (e.g., represented as a 3D rectangle) may be correlated to a particular type of server using the techniques described herein. An image 408 of that server may be obtained from one or more secondary sources. The image 408 may then be used to build up a physical rendering of a rack 410 (e.g., one of the racks 404 in image 402, assuming that each asset in that rack corresponds to an instance of the server represented by image 408). It should be noted that obtaining source images of an asset is not a requirement. If a particular asset does not have a corresponding source image available, for instance, that asset may be represented as a 3D rectangle or other placeholder visualization of an asset as desired. FIG. 4D shows an image 412 of the three racks 404 populated in FIG. 4B. In this example, it is assumed that each of the three racks are built out with the same server type, and thus each of the 3D rectangles in the three racks 404 may be replaced with a secondary source image to result in the image 414 shown in FIG. 4E. The image 414 shows a fully populated rendering of the three racks 404. The image 414 may be projected onto a Network Operations Center (NOC) wall or otherwise utilized for 3D mapping of at least a portion of a data center.

Figure 4E:
Figure 4F:
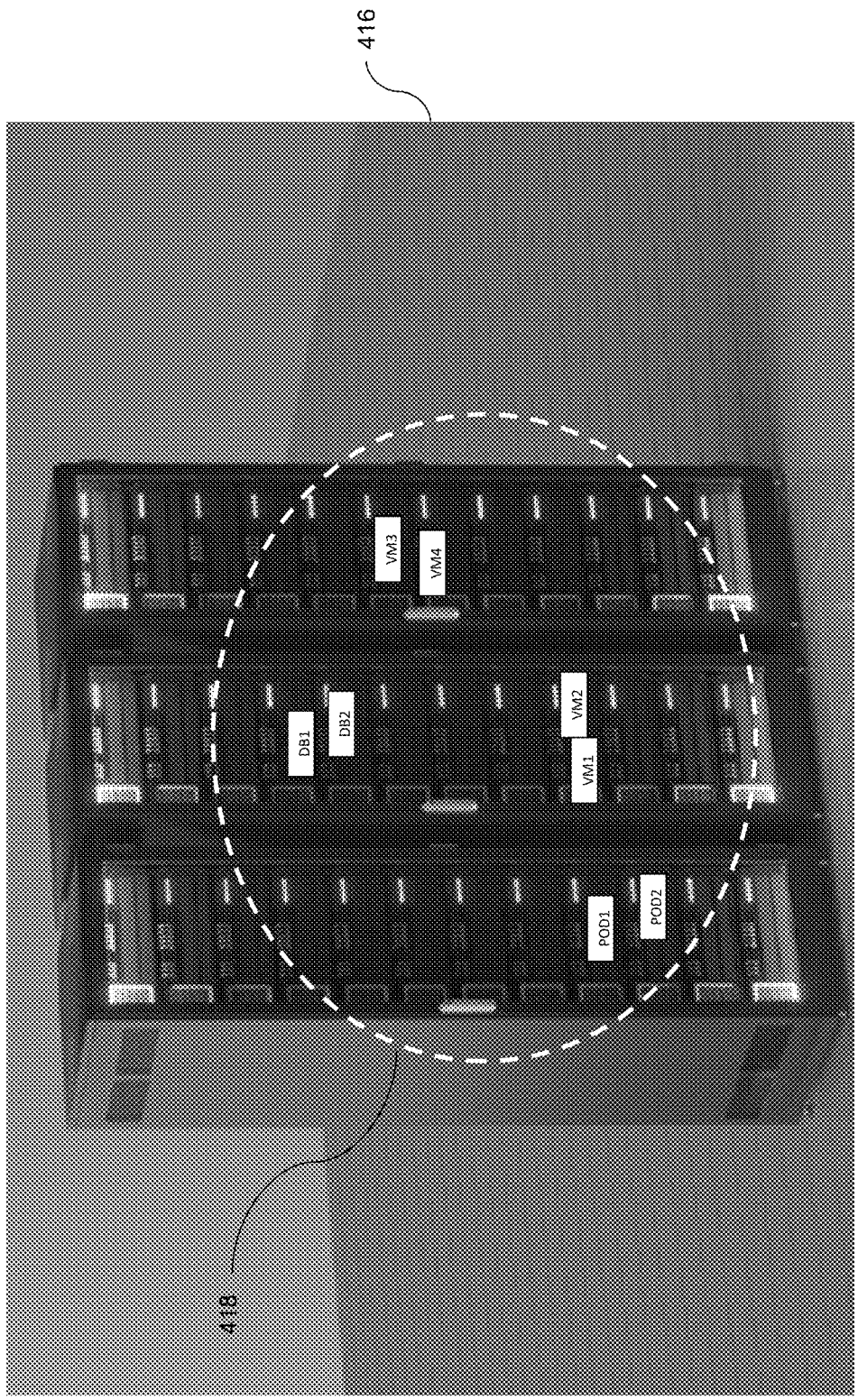

Assuming image 414 in FIG. 4E is a 3D map of a portion of a data center, image 416 in FIG. 4F represents an example of data center 3D map with metadata overlays 130 from FIG. 1. That is, metadata overlays (graphics) collectively denoted as 418 are superimposed over the assets in the racks in the 3D map of image 416. As mentioned, image 416 can be displayed on an IT administrator's smart device or on the wall of the data center.

Figure 4G:
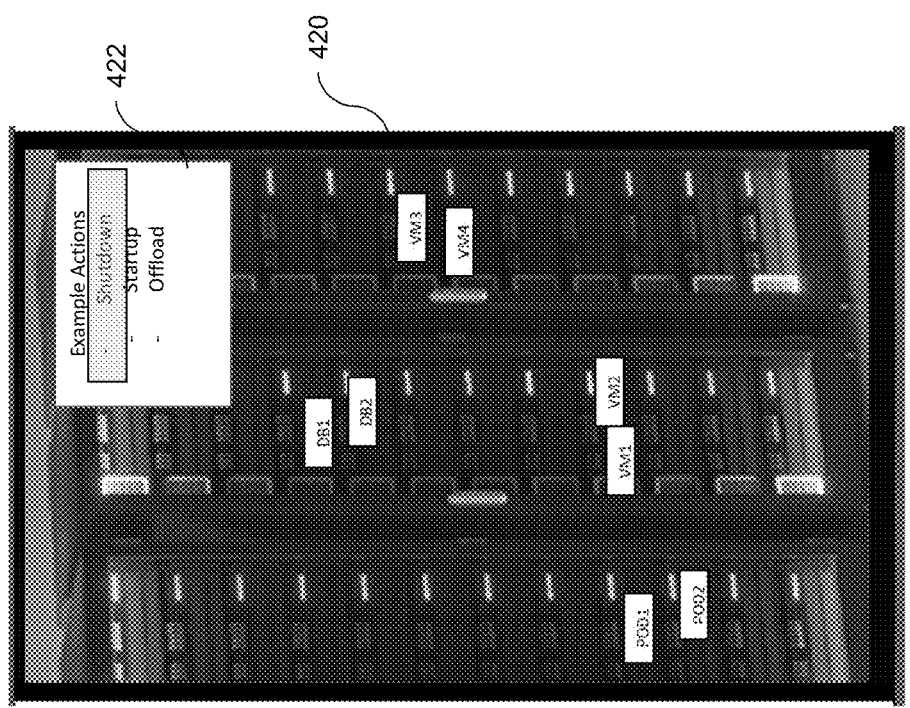
Figure 4H:
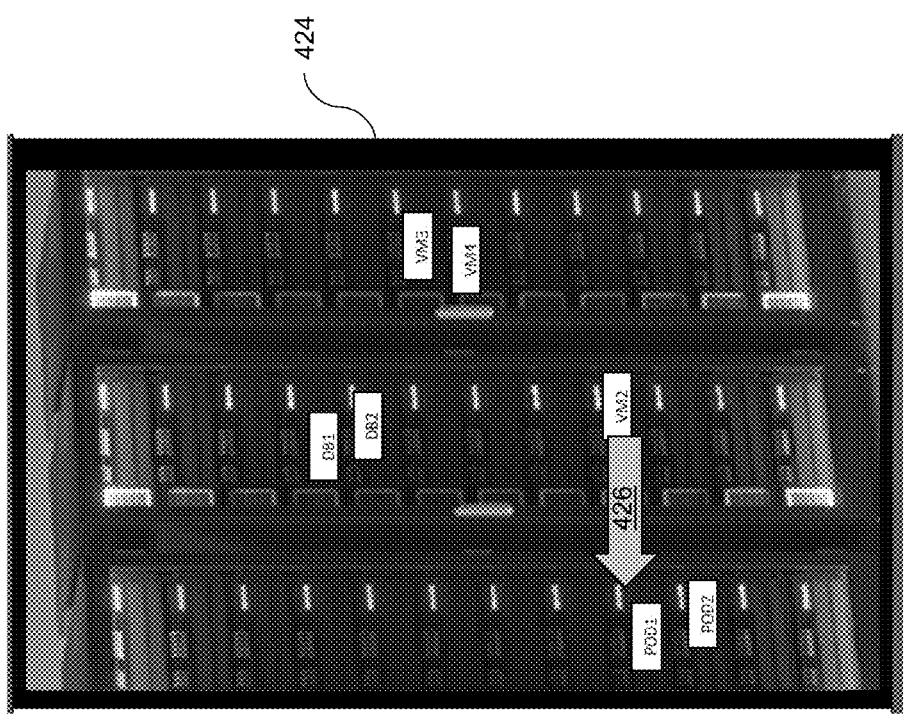
Figure 4I:
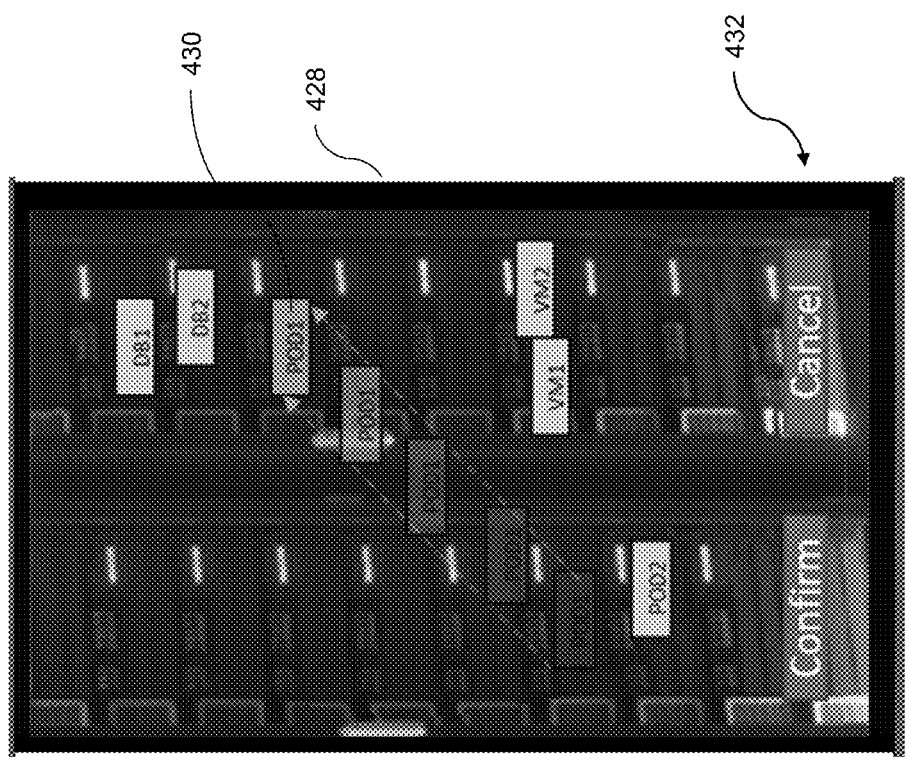

FIG. 4G illustrates a view 420 of the data center 3D map with metadata overlay on, for example, the screen of the IT administrator's smart device. The smart device is configured to enable the IT administrator to activate a pulldown menu 422 of action options. In this example, actions such as Shutdown, Startup, and Offload are depicted. Additional and/or alternative actions can be displayed in the menu 422. Assume the user selects Shutdown as the action to be visualized (e.g., by clicking on or otherwise activating the button representing the desired action option). Now as shown in view 424 in FIG. 4H, the IT administrator can select an asset and/or component to which the action is to be applied. For example, selection can be made by the IT administrator swiping left (represented by arrow 426), and thus highlighting the asset (e.g., server) and/or component (e.g., POD1 running on the server) to be impacted by the proposed shutdown. Then, in view 428 of FIG. 4I, the impact to that asset/component is visually animated as part of an additional metadata overlay 430. The IT administrator can then confirm or cancel the action using selectable buttons 432 as described below. For example, as shown, if the asset in the leftmost equipment rack is powered off, then POD1 will be automatically moved to be hosted on an asset within the next rack over (recall that a hypervisor or other virtualization manager can be configured to move a virtual component from one physical asset to another physical asset based on the IT administrator setting an asset state change, e.g., shutdown). Thus, the 3D map and metadata overlays give the IT administrator a projected impact that the action he/she seeks to perform will have on the data center. It is to be understood that the overlays shown in FIGS. 4F through 4I are intended to be examples only, and that additional and/or alternative overlays can be generated and superimposed on a data center 3D image in other embodiments.

In the context of FIG. 1, note that the proposed action to be visualized is selected on the screen of the smart device of the IT administrator or other user whereby the screen is represented as part of 130 in FIG. 1. Once the user performs a selection action such as swiping left on an asset, as mentioned above, a function call is returned through the VR controller interface 102 to the resource controller 104 to the platform and cluster interfaces 116/118. Metadata is then returned back through the resource controller 106 which uses the 3D mapping service 110, secondary sources 112 and/or topology service 114 to generate one or more overlays, as described herein. The metadata overlays are sent to the VR controller interface 102, and up to the data center 3D map 130 for display. The user will thus see the animation (e.g., 430 in FIG. 4I). The user will then be prompted to either "Confirm" action or "Cancel" action as per respective selectable buttons 432 (see FIG. 4I) displayed on the screen of the smart device. Confirm action will perform a second set of calls through the above described workflow which will initiate the migration. Cancel will reset the VR visualization to a "current view", thus removing the asset animation projection overlay 430.

Figure 5A:
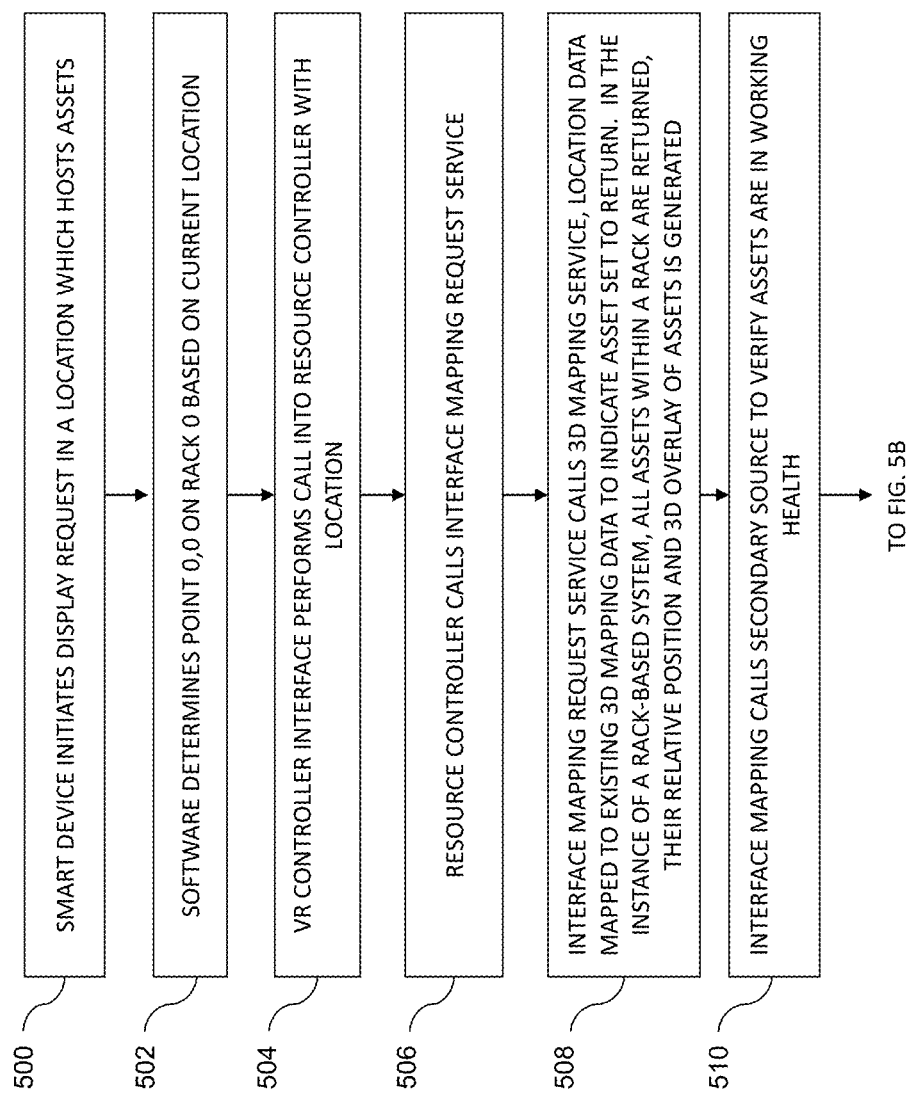
FIGS. 5A-5C illustrate a methodology for generation of a three-dimensional map of a computing environment and associated workflow impact overlays, according to an embodiment of the invention.
Figure 5B:
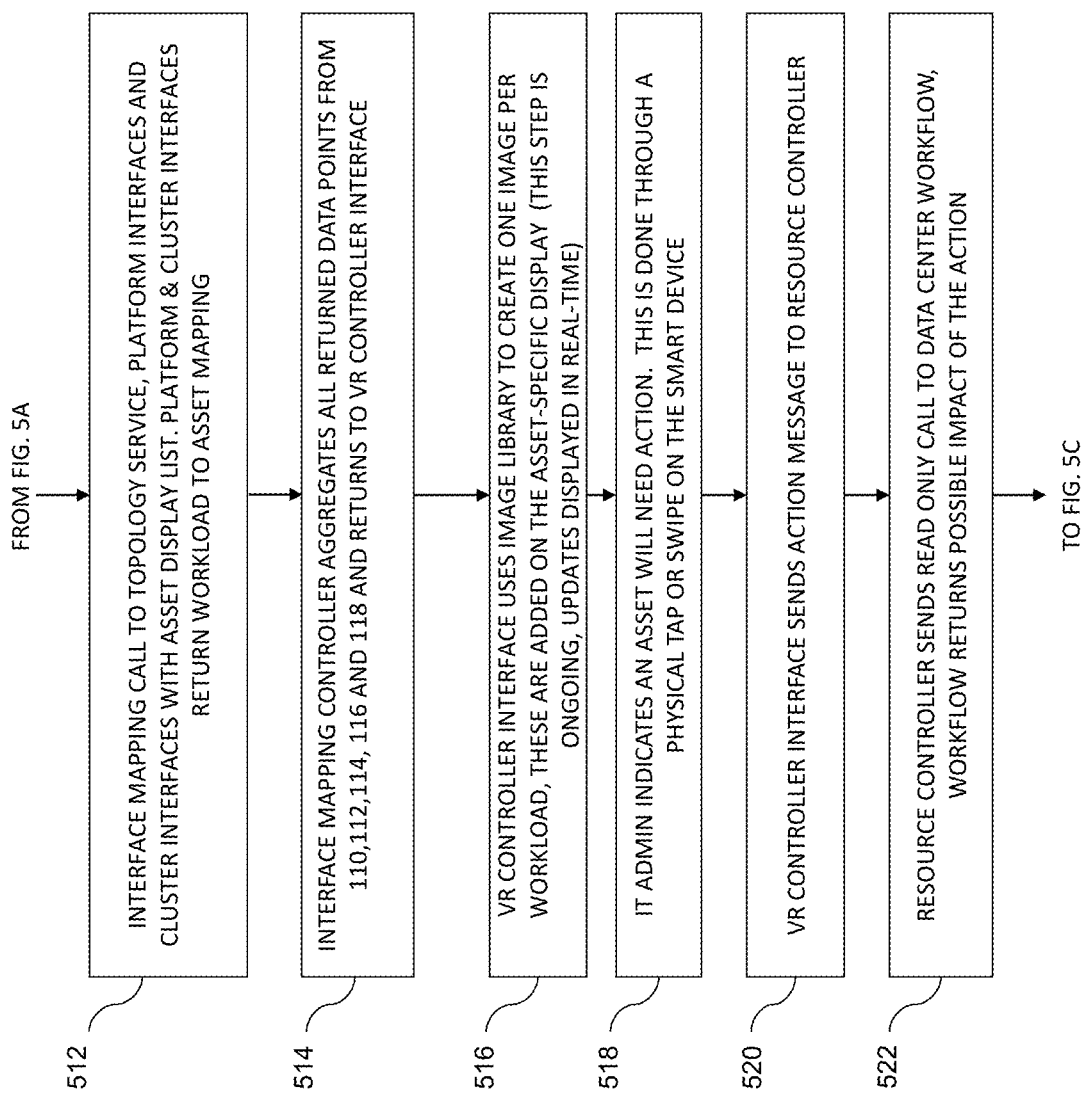
Figure 5C:
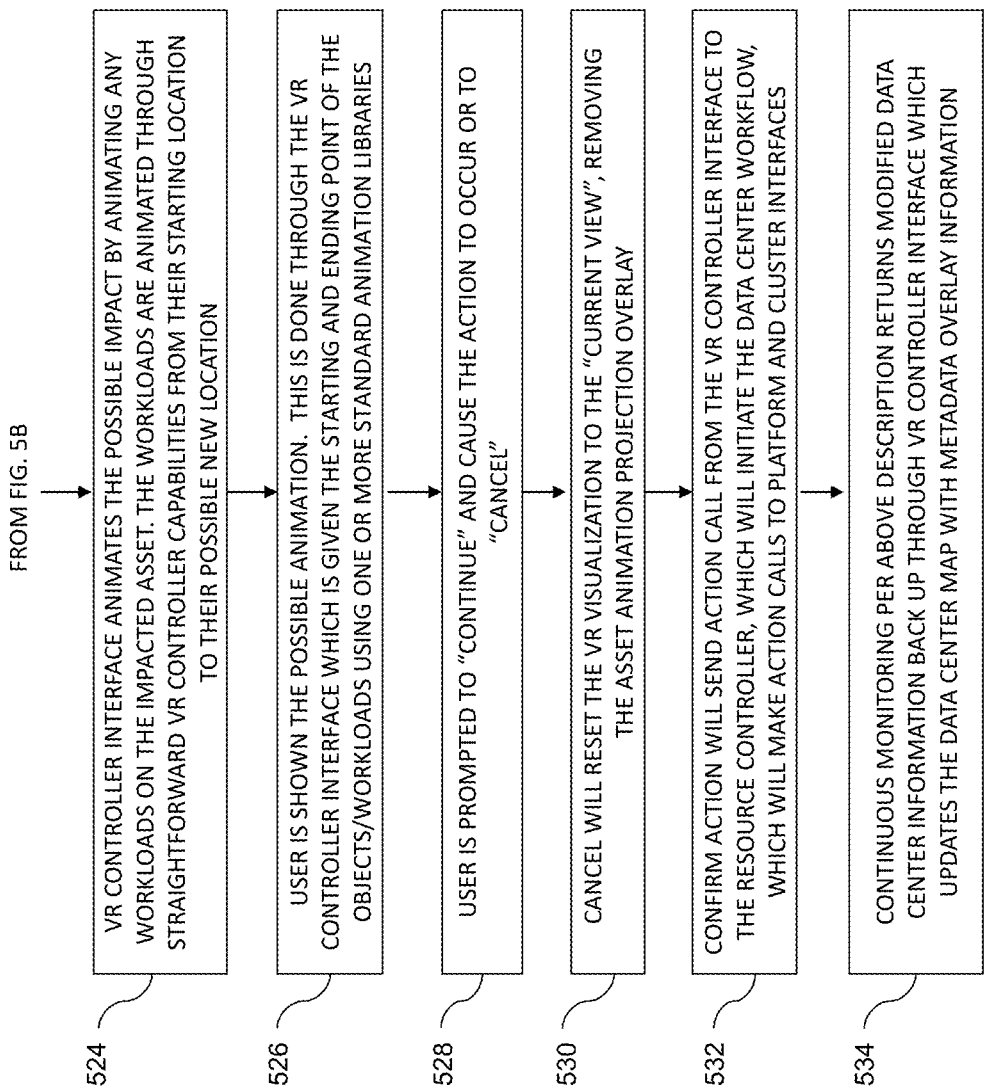

Turning now to FIGS. 5A-5C, a methodology for generation of a three-dimensional map of a computing environment and associated workflow impact overlays is depicted, according to an embodiment of the invention. It is to be appreciated that given the metadata overlay generation functionalities described above, the methodology of FIGS. 5A-5C is one example of an operational flow that may be performed by the system 100 in FIG. 1 in accordance with an illustrative embodiment.

In step 500, a smart device initiates a display request in a location which hosts assets.

In step 502, software determines point 0,0 on rack 0 based on current location.

In step 504, the VR controller interface 102 performs a call into the resource controller 104 with the location.

In step 506, resource controller 104 calls interface mapping module (request service) 106.

In step 508, interface mapping module 106 calls 3D mapping service 110, wherein the location data is mapped to existing 3D mapping data to indicate asset set to return. In the instance of a rack-based system, all assets within a rack are returned, their relative position and 3D overlay of assets is generated.

In step 510, interface mapping module 106 calls secondary source(s) 112 to verify that assets are in working health. Note that beacon data can not return feedback on aspects such as power or health, so correlation services from secondary source(s) 112 are useful to indicate the existing but "powered off" assets. This step is ongoing wherein updates are displayed in real-time.

In step 512, interface mapping module 106 calls to topology service 114, platform interfaces 116 and cluster interfaces 118 with an asset display list. Platform and cluster interfaces 116/118 return workload to interface mapping module 106. This step is also ongoing wherein updates are displayed in real-time.

In step 514, interface mapping module 106 aggregates all returned data points from 110, 112, 114, 116 and 118 and returns them to VR controller interface 102. This step is also ongoing wherein updates are displayed in real-time.

In step 516, VR controller interface 102 uses an image library to create one image per workload, these are added on the asset-specific display. This step is also ongoing wherein updates are displayed in real-time.

In step 518, the IT administrator indicates an asset will need action. This is done through a physical tap or swipe on the smart device.

In step 520, VR controller interface 102 sends an action message to resource controller 106.

In step 522, resource controller 106 sends a "read only" call to data center workflow module 108, and data center workflow module 108 returns a possible impact of the action.

In step 524, VR controller interface 102 animates the possible impact by animating any workloads on the impacted asset. The workloads are animated through straightforward VR controller interface capabilities from their starting location to their possible new location (data returned in previous step).

In step 526, the user is shown the possible animation. This is done through the VR controller interface 102 which is given the starting and ending point of the objects/workloads using one or more standard animation libraries.

In step 528, the user is prompted to "confirm" (and cause the action to occur) or to "cancel" (an cause the action not to occur).

In step 530, user-selection of "cancel" resets the VR visualization to the "current view" and remove the asset animation projection overlay.

In step 532, user-selection of "confirm" sends an action call from the VR controller interface 102 to the resource controller 104, which initiates the data center workflow module 108, which makes action calls to platform interfaces 116 and cluster interfaces 118 as needed.

In step 534, continuous monitoring per the above description returns modified data center information back up through the VR controller interface 102 which updates the data center map with metadata overlay information.

Use Case Example

Assume that, post installation, the review of a rack requires re-cabling to meet data center standards.

Prior to completing the re-cabling, the data center administrator is able to use the data center 3D map with metadata overlays generation techniques described herein, and by looking at their smart device to see what is running on a given rack.

The administrator could then choose the "project changes" option available on their smart device and choose to power down the servers on the rack as the projected change.

On the smart device of their choice, they will see an overlay of how the workloads would migrate. If they are using a smartphone, outlines or hotspot indicators would show that the workload running on rack1, server2 will be physically moved to rack2, server 1 in a drawing on the screen that overlays over the physical space. If using projection AR, the images that are projected onto Rack1, server2 will show a projected movement of the workloads to rack2, server1.

If the available platforms would become overloaded and if any applications would be left without a location to migrate to, the workloads would show as 'homeless' and an indication of the error as represented by the secondary data source (in this instance, VMware VrealizeOps).

IT personnel can make intelligent decisions based on what would be affected if they re-cabled the rack to meet the standards.

FIG. 6 illustrates a processing platform used to implement an architecture for generating maps with metadata overlays for a computing environment, according to an embodiment of the invention. More particularly, processing platform 600 is a processing platform on which a computing environment with improved map generation functionalities (e.g., FIGS. 1-5C and otherwise described herein) can be implemented.

The processing platform 600 in this embodiment comprises a plurality of processing devices, denoted 602-1, 602-2, 602-3, . . . 602-N, which communicate with one another over network(s) 604. It is to be appreciated that the methodologies described herein may be executed in one such processing device 602, or executed in a distributed manner across two or more such processing devices 602. It is to be further appreciated that a server, a client device, a computing device or any other processing platform element may be viewed as an example of what is more generally referred to herein as a "processing device." As illustrated in FIG. 6, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architecture 100 of FIG. 1 can comprise one or more of such processing devices 602 shown in FIG. 6. The network(s) 604 represent one or more communications networks that enable components to communicate and to transfer data therebetween, as well as to perform other functionalities described herein.

The processing device 602-1 in the processing platform 600 comprises a processor 610 coupled to a memory 612. The processor 610 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 610. Memory 612 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 612 may comprise electronic memory such as random-access memory (RAM), read-only memory (ROM) or other types of memory, in any combination. The one or more software programs when executed by a processing device such as the processing device 602-1 causes the device to perform functions associated with one or more of the components/steps of system/methodologies in FIGS. 1-4. One skilled in the art would be readily able to implement such software given the teachings provided herein. Other examples of processor-readable storage media embodying embodiments of the invention may include, for example, optical or magnetic disks.

Processing device 602-1 also includes network interface circuitry 614, which is used to interface the device with the networks 604 and other system components. Such circuitry may comprise conventional transceivers of a type well known in the art.

The other processing devices 602 (602-2, 602-3, . . . 602-N) of the processing platform 600 are assumed to be configured in a manner similar to that shown for computing device 602-1 in the figure.

The processing platform 600 shown in FIG. 6 may comprise additional known components such as batch processing systems, parallel processing systems, physical machines, virtual machines, virtual switches, storage volumes, etc. Again, the particular processing platform shown in this figure is presented by way of example only, and the system shown as 600 in FIG. 6 may include additional or alternative processing platforms, as well as numerous distinct processing platforms in any combination.

Also, numerous other arrangements of servers, clients, computers, storage devices or other components are possible in processing platform 600. Such components can communicate with other elements of the processing platform 600 over any type of network, such as a wide area network (WAN), a local area network (LAN), a satellite network, a telephone or cable network, or various portions or combinations of these and other types of networks.

Furthermore, it is to be appreciated that the processing platform 600 of FIG. 6 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 600 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-5C are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   in a computing environment comprising a plurality of equipment racks wherein each equipment rack comprises one or more of compute, storage and network assets;
   identifying a workflow attributed to at least a portion of the assets in at least one equipment rack in the computing environment;
   determining a projected impact associated with one or more proposed changes to one or more components of the identified workflow;
   generating one or more metadata overlays that visualize the projected impact to the one or more components of the identified workflow;
   obtaining a three-dimensional representation of the at least one equipment rack; and
   superimposing the one or more metadata overlays on the three-dimensional representation of the at least one equipment rack;
   wherein determining the projected impact associated with the one or more proposed changes to the one or more components of the identified workflow comprises identifying projected impacts relating to migration of a set of workloads running on at least a portion of the assets of said at least one equipment rack in the computing environment affected by the one or more proposed changes to the one or more components of the identified workflow.

2. The method of claim 1, further comprising presenting the three-dimensional representation with the one or more metadata overlays to a user within the computing environment.

3. The method of claim 2, wherein the presenting step is performed on a smart device in the possession of the user.

4. The method of claim 2, further comprising, prior to the generating step, obtaining a user selected action for which the projected impact to one or more components of the identified workflow pertains.

5. The method of claim 4, wherein the one or more metadata overlays comprise one or more graphics representing at least a portion of the one or more components of the identified workflow.

6. The method of claim 4, wherein the one or more metadata overlays comprise one or more graphics representing an animation associated with at least a portion of the one or more components of the identified workflow.

7. The method of claim 6, wherein the animation visually illustrates movement of a given one of the one or more components from a first asset to a second asset of the assets based on the projected impact.

8. The method of claim 4, further comprising, after presenting the one or more metadata overlays, obtaining a user confirmation to implement the selected action.

9. The method of claim 1, wherein the computing environment is a data center.

10. The method of claim 1, wherein the projected impact includes at least one negative impact associated with the one or more proposed changes.

11. A system, comprising:
at least one processor, coupled to a memory, and configured to:
in a computing environment comprising a plurality of equipment racks wherein each equipment rack comprises one or more of compute, storage and network assets;
determine a projected impact associated with one or more proposed changes to one or more components of the identified workflow;
identify a workflow attributed to at least a portion of the assets in at least one equipment rack in the computing environment;
generate one or more metadata overlays that visualize the projected impact to the one or more components of the identified workflow;
obtain a three-dimensional representation of the at least one equipment rack; and
superimpose the one or more overlays on the three-dimensional representation of the at least one equipment rack;
wherein determining the projected impact associated with the one or more proposed changes to the one or more components of the identified workflow comprises identifying projected impacts relating to migration of a set of workloads running on at least a portion of the assets of said at least one equipment rack in the computing environment affected by the one or more proposed changes to the one or more components of the identified workflow.

12. The system of claim 11, wherein the at least one processor is further configured to present the three-dimensional representation with the one or more metadata overlays to a user within the computing environment.

13. The system of claim 12, wherein the presenting is performed on a smart device in the possession of the user.

14. The system of claim 12, wherein the at least one processor is further configured to, prior to the generating the one or more metadata overlays, obtain a user selected action for which the projected impact to one or more components of the identified workflow pertains; and
wherein the one or more metadata overlays comprise one or more graphics representing at least a portion of the one or more components of the identified workflow.

15. The system of claim 14, wherein the one or more metadata overlays comprise one or more graphics representing an animation associated with at least a portion of the one or more components of the identified workflow.

16. The system of claim 15, wherein the animation visually illustrates movement of a given one of the one or more components from a first asset to a second asset of the assets based on the projected impact.

17. The system of claim 14, wherein the at least one processor is further configured to, after presenting the one or more metadata overlays, obtain a user confirmation to implement the selected action.

18. The system of claim 11, wherein the computing environment is a data center.

19. An article of manufacture comprising a processor-readable storage medium having encoded therein executable code of one or more software programs, wherein the one or more software programs when executed by at least one processing device implement steps of:
in a computing environment comprising a plurality of equipment racks wherein each equipment rack comprises one or more of compute, storage and network assets;
identifying a workflow attributed to at least a portion of the assets in at least one equipment rack in the computing environment;
determining a projected impact associated with one or more proposed changes to one or more components of the identified workflow;
generating one or more metadata overlays that visualize the projected impact to the one or more components of the identified workflow;
obtaining a three-dimensional representation of the at least one equipment rack; and
superimposing the one or more metadata overlays on the three-dimensional representation of the at least one equipment rack;
wherein determining the projected impact associated with the one or more proposed changes to the one or more components of the identified workflow comprises identifying projected impacts relating to migration of a set of workloads running on at least a portion of the assets of said at least one equipment rack in the computing environment affected by the one or more proposed changes to the one or more components of the identified workflow.

20. The article of claim 19, further comprising presenting the three-dimensional representation with the one or more metadata overlays to a user within the computing environment.

* * * * *